United States Patent
Rick

(10) Patent No.: US 9,120,459 B2
(45) Date of Patent: Sep. 1, 2015

(54) SAFETY DEVICE WITH ELASTIC MEMBRANE

(71) Applicant: GM GLOBAL TECHNOLOGY OPERATIONS LLC, Detroit, MI (US)

(72) Inventor: Ulrich Rick, Braunweiler (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 13/656,410

(22) Filed: Oct. 19, 2012

(65) Prior Publication Data

US 2013/0099469 A1 Apr. 25, 2013

(30) Foreign Application Priority Data

Oct. 20, 2011 (DE) .......................... 10 2011 116 447

(51) Int. Cl.
- *B60R 21/231* (2011.01)
- *B60R 21/26* (2011.01)
- *B60R 21/235* (2006.01)
- *B60R 21/261* (2011.01)

(52) U.S. Cl.
CPC .............. *B60R 21/26* (2013.01); *B60R 21/235* (2013.01); *B60R 21/261* (2013.01); *B60R 2021/23123* (2013.01); *B60R 2021/2612* (2013.01)

(58) Field of Classification Search
CPC ................ B60R 21/231; B60R 21/235; B60R 2021/23123; B60R 2021/23519; B60R 2021/23523; B60R 2021/23528
USPC .............. 280/741, 740, 742, 743.1, 748, 751, 280/728.1
See application file for complete search history.

(56) References Cited

U.S. PATENT DOCUMENTS

| | | | | | |
|---|---|---|---|---|---|
| 3,756,620 | A | * | 9/1973 | Radke ........................ | 280/743.2 |
| 3,900,210 | A | * | 8/1975 | Lohr et al. .................... | 280/729 |
| 4,556,236 | A | | 12/1985 | Scholz et al. | |
| 4,830,401 | A | * | 5/1989 | Honda .......................... | 280/736 |
| 4,902,036 | A | * | 2/1990 | Zander et al. ................. | 280/736 |
| 4,944,527 | A | * | 7/1990 | Bishop et al. ................. | 280/741 |
| 5,066,039 | A | * | 11/1991 | Shitanoki et al. .......... | 280/743.1 |
| 5,071,161 | A | * | 12/1991 | Mahon et al. ................. | 280/739 |
| 5,104,727 | A | * | 4/1992 | Wnenchak .................... | 442/268 |

(Continued)

FOREIGN PATENT DOCUMENTS

| | | |
|---|---|---|
| DE | 4038910 A1 | 6/1992 |
| DE | 19546143 A1 | 6/1997 |

(Continued)

OTHER PUBLICATIONS

Great Britaint Patent Office, Great Britain Search Report for Great Britain Application No. 1217259.9, dated Jan. 25, 2013.

*Primary Examiner* — Ruth Ilan
(74) *Attorney, Agent, or Firm* — Ingrassia Fisher & Lorenz PC

(57) ABSTRACT

A safety device is provided, comprising an elastic membrane, which partially or completely delimits a hollow space, which is provided for the accident-initiated filling subject to elastic expansion of the membrane, and a gas generator with a filling fluid source communicating with the hollow space, wherein between the filling fluid source and a surface of the membrane facing the hollow space and/or in the membrane at least one heat protection means is arranged, which is provided for the protection of the membrane from a thermal impact through filling fluid of the filling fluid source.

10 Claims, 1 Drawing Sheet

(56) References Cited

U.S. PATENT DOCUMENTS

| | | |
|---|---|---|
| 5,452,914 A | 9/1995 | Hirai |
| 5,599,585 A * | 2/1997 | Cohen ........................ 427/250 |
| 5,879,767 A | 3/1999 | Matsushima et al. |
| 5,904,370 A | 5/1999 | Steiner et al. |
| 5,924,724 A | 7/1999 | Nakamura et al. |
| 5,997,034 A | 12/1999 | Hirai et al. |
| 6,170,871 B1 | 1/2001 | Goestenkors et al. |
| 6,467,802 B2 | 10/2002 | Heigl |
| 7,007,974 B2 * | 3/2006 | Kreuzer ..................... 280/743.1 |
| 7,820,566 B2 * | 10/2010 | Breed et al. .................. 442/186 |
| 7,891,705 B2 * | 2/2011 | Dennis ....................... 280/743.1 |
| 2002/0017779 A1 | 2/2002 | Gilpatrick et al. |
| 2004/0100080 A1 | 5/2004 | DePue et al. |
| 2005/0189054 A1 | 9/2005 | Zeuner et al. |
| 2006/0066088 A1 | 3/2006 | Hier et al. |
| 2006/0267324 A1 * | 11/2006 | Britz et al. ................. 280/743.1 |

FOREIGN PATENT DOCUMENTS

| | | |
|---|---|---|
| DE | 19934249 A1 | 2/2001 |
| DE | 10232287 A1 | 2/2004 |
| DE | 102005052381 A1 | 5/2007 |
| DE | 102006013016 A1 | 9/2007 |
| DE | 102010006266 A1 | 8/2011 |

* cited by examiner

SAFETY DEVICE WITH ELASTIC MEMBRANE

CROSS-REFERENCE TO RELATED APPLICATION

This application claims priority to German Patent Application No. 10 2011 116 447.6, filed Oct. 20, 2011, which is incorporated herein by reference in its entirety.

TECHNICAL FIELD

The technical field relates to a safety device, in particular for a motor vehicle, with an elastic membrane that delimits a hollow space, which is provided for the accident-initiated filling subject to elastic expansion of the membrane, as well as to a method for the accident-initiated filling of a hollow space of such a safety device.

BACKGROUND

From DE 195 46 143 A1 a safety device for a motor vehicle is known, wherein a gas generator inflates an expandable bladder of rubber or latex in order to realize an impact body. In particular, when the gas generator pyrotechnically generates filling fluid, this can impact on the rubber or latex bladder with very high temperature, which can be in the order of magnitude of 1,000 K and damage said bladder.

Accordingly, it is desirable to provide methods and system to improve a safety device.

SUMMARY

According to an embodiment, a safety device comprises a gas generator with a filling fluid source as well as an elastic membrane, which partially or completely delimits at least one hollow space, which is provided for the accident-initiated filling subject to elastic expansion of the membrane and communicates with the gas generator.

A membrane according to various embodiments is to mean a body with the wall thickness of which relative to its surface in a state that is not elastically deformed is small, in particular a body wherein the quotient of wall thickness divided by surface area is a maximum of 0.05%, preferably a maximum of 0.01%, as is the case for example with a rectangular plate having 10 cm side length and 1 mm wall thickness (1/(100× 100)=0.01%). An elastic membrane according to various embodiments is to mean in particular a membrane which is highly deformable elastically, in particular a membrane, the elongation at break of which, for example in the tensile test according to DIN53504, is at least 100% and preferentially at least 500% and/or the modulus of elasticity of which at room temperature is a maximum of 0.5 GPa, preferably a maximum of 0.1 GPa. An elastic membrane comprises one or a plurality of elastomers. In various embodiments it consists of this elastomer or these elastomers. An elastomer can be in particular natural or synthetic rubber, silicone or a thermoplastic elastomer (TPE).

A hollow space can, at least substantially, be entirely or wholly delimited by the elastic membrane in that it is embodied in a double-walled or hose-like manner. This makes available a lot of expansion material and can thus make possible a greater expansion. Equally, a hollow space can only be partially delimited by the elastic membrane in that it is single-walled and fastened to a carrier, preferentially by its edge, in an at least substantially fluid-tight manner, which carrier in turn defines a wall of the hollow space. Relative to a double-walled embodiment, this can reduce the installation space. In particular, the carrier can be fastened to a structural element of a motor vehicle or form such. Equally, a carrier can form a housing of the safety device, in particular of the gas generator, or form part of such a housing.

In order to communicate with a hollow space, the gas generator can be permanently or optionally connected fluidly to the hollow space, in particular via one or a plurality of valve devices. The filling fluid source can generate a filling fluid, in particular a gas, when required, preferentially pyrotechnically. In addition or alternatively, the filling fluid source can also comprise a filling fluid that is stored under pressure, in particular gas, which when required can be fed to the hollow space, preferentially in a controlled manner, and in particular via one or a plurality of valve devices in order to expand said hollow space. In a further embodiment, the gas generator is designed as or contains at least one micro gas generator (MGG).

According to various embodiments, one or a plurality of heat protection means are arranged between the filling fluid source and a surface of the membrane facing the hollow space. Additionally or alternatively, one or a plurality of heat protection means can be arranged in the membrane. The heat protection means is or are provided to protect the membrane from a thermal impact through filling fluid of the filling fluid source.

Because of this, a thermal loading of the membrane is advantageously reduced. Additionally or alternatively, a thermal loading of the membrane can be delayed in time or slowed down. In this manner, a damaging of the membrane, in particular shortly after its filling, can be reduced or avoided in order to realize its protection functionality.

A heat protection means in terms according to various embodiments can act in different ways. In an embodiment, a heat protection means has a thermal conductivity other than the membrane. The thermal conductivity can be defined in particular through the preferentially specific coefficient of thermal conductivity, which can be preferentially given in W/(m×K) and/or at a reference temperature, in particular 20° C., and for example for rubber is between approximately 0.1 and 0.2 W/(m×K) and for metal is generally greater by the factor of 10 or more.

In various embodiments, the thermal conductivity of a heat protection means, in particular its coefficient of thermal conductivity $\lambda$, is greater than that of the membrane, for example by the factor 10, in particular by the factor 20, in order to discharge heat away from the filling fluid or from the membrane. In various embodiments, the thermal conductivity of a heat protection means, in particular its coefficient of thermal conductivity $\lambda$, is smaller than that of the membrane, preferentially by the factor 10, in particular by the factor 20, in order to thermally insulate the membrane against the filling fluid.

In addition or alternatively, a heat protection means can have a thermal capacity other than the membrane. The thermal capacity C can be defined through the quotient of a fed in heat quantity Q to the achieved temperature increase $\Delta T$ ($C=Q/\Delta T$), in particular through the specific heat capacity c C/M with the mass m of the heat protection means, which can preferentially be stated in kJ/(kg×K) and/or at a reference temperature, in particular 20° C. and which for example for rubber is between approximately 1 and 2 (kJ/kg×K) and for metal generally smaller by the factor 2 or more.

In various embodiments, the thermal capacity of a heat protection means is greater than that of the membrane, preferentially by the factor 2, in particular by the factor 2.5 in order to store and thus, at least at times, absorb heat of the filling fluid before the membrane. In various embodiments, the thermal capacity of a heat protection means is smaller than that of the membrane, preferentially by the factor 2, in particular by the factor 2.5 in order to keep heat away from the filling fluid.

In addition or alternatively, a heat protection means can have a melting point other than that of the membrane. In various embodiments, the melting point of a heat protection means is greater than that of the membrane, preferentially by at least 100 K; in particular by at least 500 K in order to prevent or delay a melting of the membrane through direct contact with hot filling fluid. In various embodiments, the melting point of a heat protection means is smaller than that of the membrane, preferentially by at least 20 K, in particular by at least 100 K, in order to serve as sacrifice material. In particular in the case of elastomer membranes, a melting point can only be determined with difficulty. For this reason, a heat protection means with a melting point that is between 100° C. and 300° C. is provided.

Additionally or alternatively to the conduction, (intermediate) storage or insulation of heat explained above, one or more heat protection means for cooling-down of filling fluid can be provided before a contact with the membrane. A cooling-down can be provided in particular in that the filling fluid gives off heat to the heat protection means before it impacts on the membrane. Additionally or alternatively, the filling fluid can be cooled down fluidly, in particular through deflection, swirling and/or speed change before it impacts on the membrane.

A heat protection means in various embodiments can be arranged on the surface of the membrane facing the hollow space. In particular, it can be designed as vapor-deposited single or multiple-layer coating of the membrane or as single or multiple-layer film, which is connected to the membrane, in particular glued. In particular, such a flexible film or coating can be arranged partially in one or a plurality of regions exposed to the blowing-on of filling fluid, so that in particular the deformation characteristic of the membrane is little influenced.

Additionally or alternatively, one or a plurality of heat protection means can be arranged on a carrier, which partially delimits the hollow space, and/or the gas generator. In various embodiments, such a heat protection means is designed dimensionally stable, in particular as plate. The plate can comprise break-throughs which act as a diffuser and can be designed in particular mesh, net or sieve-like. A dimensionally stable heat protection means can advantageously redirect filling fluid, thus diverting it in particular from threatened regions of the membrane.

A heat protection means can be designed fleece-like, which in this case is to also mean woven fabric, knitted fabric and the like. When flowing through a fleece-like heat protection means, the filling fluid contacts the latter over a large surface area, so that a heat exchange between heat protection means and filling fluid can be increased. In particular, sacrifice material, which is provided for the melting through the filling fluid, can be designed fleece-like in order to absorb as much heat from the filling fluid as possible.

A heat protection means, in particular a membrane coating, a film, a dimensionally stable flow redirection and/or a fleece can comprise one or a plurality of metals, in particular silver and in various embodiments, can consist thereof. In various embodiments, a surface of the membrane facing the hollow space can be coated through vacuum metal vapor deposition in a thin layer and/or partially in blown-at regions.

As described above, filling fluid is deflected through one or a plurality of heat protection means. In particular, a heat protection means can insulate one or a plurality of regions of the membrane. Additionally or alternatively, a heat protection means can cool down the filling fluid. In various embodiments, a heat input of filling fluid in the membrane, compared with a configuration without the heat protection means, is reduced through the deflection and/or cooling-down in an inflating period of time, preferentially within a second, by at least 1 kJ, in particular by at least 10 kJ.

In addition or alternatively to one or a plurality of heat protection means arranged before or on the surface of the membrane, a heat protection means can be arranged in the membrane, in order to increase its melting temperature, by absorbing heat. In various embodiments, a heat protection means arranged in the membrane can comprise nano particles, the particle size of which is preferentially a maximum of 500 nm, in particular a maximum of 100 nm and preferentially a maximum of 25 nm. A heat protection means arranged in the membrane can comprise in particular one or a plurality of silicates and/or earths, or consist thereof.

The membrane can be designed in single or multiple layers. In particular, reinforcing elements such as for example bands, areal elements or nets, preferentially of textile material, can be locally arranged on a membrane, which have a greater modulus of elasticity and therefore expand less during inflating. Reinforcing elements can in particular be connected at certain locations or substantially with a complete side to the inside and/or outside of the membrane in a materially joined manner, for example glued, welded, laminated-in or vulcanized on. The elastic membrane then expands during inflating in a substantially tied-up manner through reinforcing elements connected to it in certain locations and acting as catching bands or in addition to the reinforcing elements that are completely connected to it, so that these influence the shape and expansion characteristic of the inflated membrane.

In various embodiments, a safety device is used in a motor vehicle, in particular in a passenger car, wherein the hollow space is provided for catching an occupant. Equally, the safety device can be, for example, on an item of clothing in order to protect its wearer in the event of an accident.

BRIEF DESCRIPTION OF THE DRAWINGS

The present disclosure will hereinafter be described in conjunction with the following drawing figures, wherein like numerals denote like elements, and.

DETAILED DESCRIPTION

The following detailed description is merely exemplary in nature and is not intended to limit the disclosure or its application and uses. Furthermore, there is no intention to be bound by any theory presented in the preceding background or the following detailed description.

Figure 1:
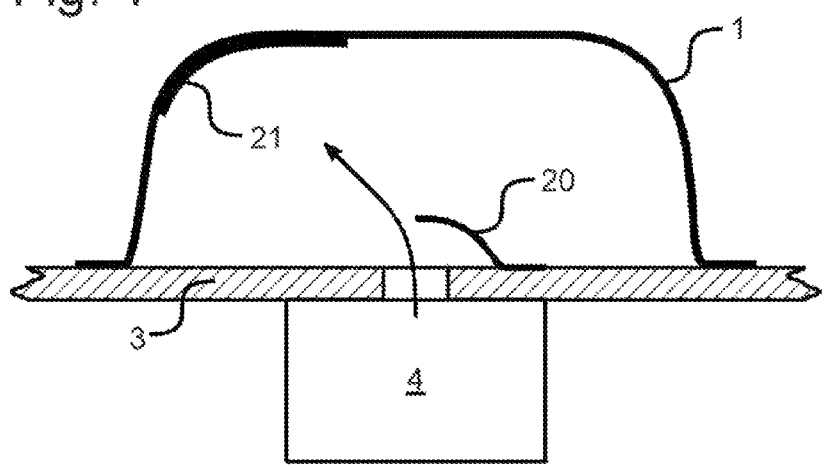
FIG. 1 is a safety device according to an embodiment in cross section.

FIG. 1 exemplarily shows a safety device according to an embodiment in the form of an impact cushion for a motor vehicle in cross section. The safety device comprises an elastic membrane 1 of synthetic or natural rubber, which is fastened in a single layer through a carrier 3 through vulcanizing, gluing or the like and together with said carrier, defines a hollow space. On the side located opposite the hollow space, a gas generator 4 with a pyrotechnical filling fluid source (not shown) is provided, which communicates with the hollow space.

If an imminent or occurred accident is detected, the gas generator 4 inflates the hollow space, which subject to elastic expansion of the membrane 1 expands into the state shown in FIG. 1. Here, filling fluid in the form of pyrotechnically generated gas flows into the hollow space with a temperature of approximately 1,200 K, as is indicated by a flow arrow.

In order to protect the rubber membrane 1 from a high, direct thermal impact through the filling fluid, the safety device of FIG. 1 comprises two interacting heat protection means 20, 21:

A first heat protection means 20 is designed as dimensionally stable deflection plate over an outflow opening of the gas generator 4 in the carrier 3, in order to deflect hot filling fluid from unprotected surface regions of the membrane 1 (right in FIG. 1). Instead, the hot filling fluid is directed onto a defined region of the surface of the membrane 1 facing the hollow space (left in FIG. 1).

There, a second heat protection means 21 in the form of a metal coating vapor-deposited under vacuum or a glued-on metal, in particular silver foil is partially arranged. Through this second heat protection means 21 partially arranged in the region blown-on by the filling fluid, the membrane 1 is protected from direct contact with hot filling fluid. The metal coating or film 21 comprises in particular a high melting point and prevents a partial melting of the membrane 1, at least during the expansion. Here, the second heat protection means 21 advantageously absorbs heat of the filling fluid, storing it before passing it on to the membrane 1 in a delayed manner. If said membrane as a consequence partially melts or melts through later on, this is not problematic since the hollow space has already exercised its protective function at that time. In an advantageous further embodiment, the partial melting can be specifically controlled so that vent openings form in the membrane so that a ventilation behavior can be predetermined.

Figure 2:
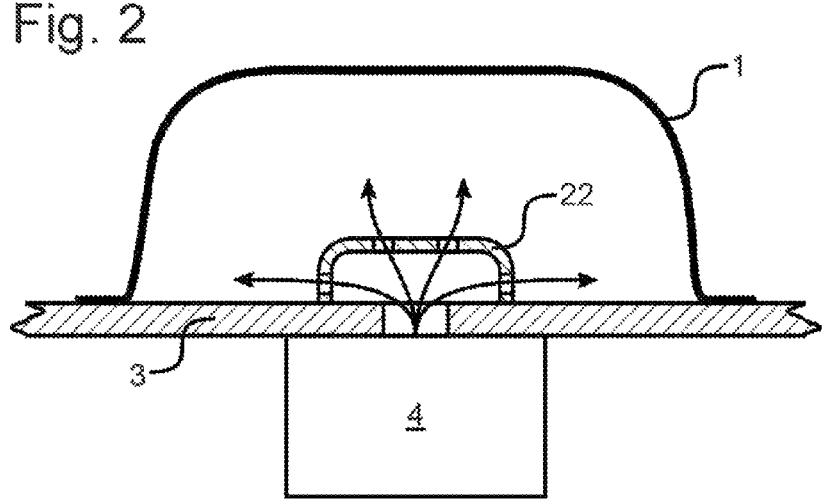
FIG. 2 is a safety device according to a further embodiment realized corresponding to FIG. 1.

FIG. 2 shows a safety device according to a further embodiment. Elements corresponding to the embodiment explained above are described by identical reference characters, so that in the following only the differences to this embodiment are discussed.

In the elastic membrane 1 of the embodiment of FIG. 2, nano particles of silicates and/or earths are imbedded during casting. These advantageously increase the melting temperature of the membrane.

Additionally, a dimensionally stable heat protection means, in the form of a plate 22 with diffuser openings is arranged, here too, above the outflow opening of the gas generator 4 in the carrier 3, which spaces the membrane 1 from the outflow opening. In addition, the hot filling fluid from the filling fluid source is cooled down through heat exchange with the metal plate 22 and speed increase in its diffuser openings, before it impacts on the surface of the membrane 1 facing the hollow space, as is indicated by flow arrows.

In a modification which is not shown, a fleece-like heat protection means is arranged in addition or alternatively to the plate 22 above the outflow opening of the gas generator 4 in the carrier 3, which swirls filling fluid that flows through in order to cool it down and absorb heat from it. Here it can be provided that the fleece-like heat protection means is at least partially melted through the filling fluid in order to absorb heat from it as sacrifice material.

Although exemplary embodiments were explained in the preceding description it is pointed out that a multiplicity of modifications is possible. It is pointed out in addition that the exemplary embodiments are merely examples which are not intended to restrict the scope of protection, the applications and the construction in any way. On the contrary, through the preceding description, the person skilled in the art is merely given a guideline for implementing at least one exemplary embodiment, wherein various changes, in particular with respect to the function and arrangement of the described components can be carried out without leaving the scope of protection, as is obtained from the claims and its equivalent characteristic combinations.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A safety device for a motor vehicle, comprising:
   an elastic membrane having a membrane melting point, which partially or completely delimits a hollow space, which is provided for an accident-initiated filling subject to elastically expand the membrane;
   a gas generator with a filling fluid source communicating with the hollow space; and
   a carrier that partially delimits the hollow space and defines an outflow opening that communicates the filling fluid from the gas generator to the hollow space,
   wherein between the filling fluid source and a surface of the membrane facing the hollow space or in the membrane, at least one heat protection means is arranged, which is provided for protecting the membrane from a thermal impact by filling fluid of the filling fluid source, wherein the at least one heat protection means includes a first heat protection means and a second heat protection means, wherein the second heat protection means has a heat protection melting point greater than the membrane melting point and is arranged on a partial region of the surface of the membrane facing the hollow space, wherein the partial region is less than the entire surface of the membrane facing the hollow space, and wherein the first heat protection means is a dimensionally stable plate arranged over the outflow opening on the carrier and oriented to deflect the filling fluid onto the partial region of the surface of the membrane facing the hollow space.

2. The safety device according to claim 1, wherein at least one of the first and second heat protection means has at least one of another thermal conductivity and thermal capacity than the membrane.

3. The safety device according to claim 2, wherein the at least one of the first and second heat protection means is provided for cooling filling fluid before contact with the membrane.

4. The safety device according to claim 1, wherein the second heat protection means is provided as sacrifice material for melting by filling fluid.

5. The safety device according to claim 1, wherein the second heat protection means is a metal coating vapor-deposited under vacuum or is a glued-on metal.

6. The safety device according to claim 1, wherein the second heat protection means is designed flexible as a coating of the membrane or as a film.

7. The safety device according to claim 6, wherein the second heat protection means comprises at least one metal.

8. The safety device according to claim 1, wherein the elastic membrane is a single layer that comprises at least one elastomer.

9. A method for the accident-initiated filling of a hollow space of a safety device, comprising an elastic membrane having a membrane melting point, which partially or completely delimits a hollow space, which is provided for an accident-initiated filling subject to elastically expand the membrane, and a gas generator with a filling fluid source communicating with the hollow space, wherein between the filling fluid source and a surface of the membrane facing the hollow space or in the membrane, at least one heat protection means is arranged, which is provided for protecting the membrane from a thermal impact by filling fluid of the filling fluid source, the method comprising:

through its gas generator, reducing a thermal impact of the membrane through the filling fluid by means of at least one heat protection means by deflecting a filling fluid with a first of the at least one heat protection means towards a second of the at least one heat protection means, having a heat protection melting point greater than the membrane melting point, that is arranged on a partial region of the surface of the membrane facing the hollow space, wherein the partial region is less than the entire surface of the membrane facing the hollow space, after the filling fluid passes through an outflow opening of a carrier which partially delimits the hollow space.

10. The method according to claim 9, further comprising reducing a heat input of filling fluid in the membrane by at least one of the first and second heat protection means by at least 10 kJ.

\* \* \* \* \*